(12) United States Patent
Schultz et al.

(10) Patent No.: US 7,979,907 B2
(45) Date of Patent: *Jul. 12, 2011

(54) SYSTEMS AND METHODS FOR DETECTION OF NEW MALICIOUS EXECUTABLES

(75) Inventors: Matthew G. Schultz, Ithaca, NY (US); Eleazar Eskin, Santa Monica, CA (US); Erez Zadok, Middle Island, NY (US); Manasi Bhattacharyya, Flushing, NY (US); Stolfo Salvatore J., Ridgewood, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 129 days.

This patent is subject to a terminal disclaimer.

(21) Appl. No.: 12/338,479

(22) Filed: Dec. 18, 2008

(65) Prior Publication Data

US 2009/0254992 A1 Oct. 8, 2009

Related U.S. Application Data

(63) Continuation of application No. 10/208,432, filed on Jul. 30, 2002, now Pat. No. 7,487,544.

(60) Provisional application No. 60/308,622, filed on Jul. 30, 2001, provisional application No. 60/308,623, filed on Jul. 30, 2001.

(51) Int. Cl.
*G06F 11/00* (2006.01)
*G06F 12/14* (2006.01)

(52) U.S. Cl. .............................. 726/24; 726/13; 713/188

(58) Field of Classification Search .................... 726/13, 726/22–25; 713/156, 188; 709/206, 207, 709/225
See application file for complete search history.

(56) References Cited

U.S. PATENT DOCUMENTS

| | | | | |
|---|---|---|---|---|
| 5,832,208 A * | 11/1998 | Chen et al. | ....................... | 726/24 |
| 6,016,546 A * | 1/2000 | Kephart et al. | .................. | 726/24 |
| 6,161,130 A * | 12/2000 | Horvitz et al. | ................ | 709/206 |
| 6,732,149 B1 * | 5/2004 | Kephart | ........................ | 709/206 |
| 2004/0073617 A1 * | 4/2004 | Milliken et al. | .............. | 709/206 |
| 2009/0132669 A1 * | 5/2009 | Milliken et al. | .............. | 709/206 |

* cited by examiner

*Primary Examiner* — Gilberto Barron, Jr.
*Assistant Examiner* — Abdulhakim Nobahar
(74) *Attorney, Agent, or Firm* — Baker Botts LLP

(57) ABSTRACT

A system and methods for detecting malicious executable attachments at an email processing application of a computer system using data mining techniques. The email processing application may be located at the server or at the client or host. The executable attachments are filtered from said email, and byte sequence features are extracted from the executable attachment. The executable attachments are classified by comparing the byte sequence feature of the executable attachment to a classification rule set derived from byte sequence features of a data set of known executables having a predetermined class in a set of classes, e.g., malicious or benign. The system is also able to classify executable attachments as borderline when the difference between the probability that the executable is malicious and the probability that the executable is benign are within a predetermined threshold. The system can notify the user when the number of borderline attachments exceeds the threshold in order to refine the classification rule set.

20 Claims, 7 Drawing Sheets

$$\neg advapi32 \wedge avicap32 \wedge \cdots \wedge winmm \wedge \neg wsock32$$

FIG. 3

$$advapi32.AdjustToken\,Privileges()$$
$$\wedge\ advapi32.GetFileSecurityA() \wedge \cdots$$
$$\wedge\ wsock32.recv() \wedge wsock32.send()$$

FIG. 4

$$advapi32 = 2 \wedge avicap32 = 10 \wedge \cdots$$
$$\wedge\quad winmm = 8 \wedge wsock32 = 2$$

FIG. 5

$$malicious \;\; := \neg user32.EndDialog() \wedge$$
$$kernel32.EnumCalendarInfoA()$$
$$malicious \;\; := \neg user32.LoadIconA() \wedge$$
$$\neg kernel32.GetTempPathA() \wedge \neg advapi32.$$
$$malicious \;\; := shell32.ExtractAssociatedIconA()$$
$$malicious \;\; := msvbvm.$$
$$Benign \;\; :- otherwise$$

FIG. 6

$$P("windows"|benign) \;\; = \;\; 45/47$$
$$P("windows"|malicious) \;\; = \;\; 2/47$$
$$P("*.COM"|benign) \;\; = \;\; 1/12$$
$$P("*.COM"|malicious) \;\; = \;\; 11/12$$

FIG. 7

SYSTEMS AND METHODS FOR DETECTION OF NEW MALICIOUS EXECUTABLES

CLAIM FOR PRIORITY TO RELATED APPLICATIONS

This application claims the benefit of U.S. Provisional Patent Application Ser. Nos. 60/308,622, filed Jul. 30, 2001, entitled "Data Mining Methods for Detection of New Malicious Executables" and 60/308,623, filed on Jul. 30, 2001, entitled "Malicious Email Filter" which are incorporated by reference in their entirety herein. This application is a continuation of and claims the priority from U.S. patent application Ser. No. 10/208,432, filed Jul. 30, 2002, now U.S. Pat. No. 7,487,544 which is incorporated by reference in its entirety herein.

STATEMENT OF GOVERNMENT RIGHT

The present invention was made in part with support from the United States Defense Advanced Research Projects Agency (DARPA) grant nos. FAS-526617 and SRTSC-CU019-7950-1. Accordingly, the United States Government may have certain rights to this invention.

COPYRIGHT NOTICE

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

BACKGROUND OF THE INVENTION

1. Field of the Invention

This invention relates to systems and methods for detecting malicious executable programs, and more particularly to the use of data mining techniques to detect such malicious executables in email attachments.

2. Background

A malicious executable is a program that performs a malicious function, such as compromising a system's security, damaging a system or obtaining sensitive information without the user's permission. One serious security risk is the propagation of these malicious executables through e-mail attachments. Malicious executables are used as attacks for many types of intrusions. For example, there have been some high profile incidents with malicious email attachments such as the ILOVEYOU virus and its clones. These malicious attachments are capable of causing significant damage in a short time.

Current virus scanner technology has two parts: a signature-based detector and a heuristic classifier that detects new viruses. The classic signature-based detection algorithm relies on signatures (unique telltale strings) of known malicious executables to generate detection models. Signature-based methods create a unique tag for each malicious program so that future examples of it can be correctly classified with a small error rate. These methods do not generalize well to detect new malicious binaries because they are created to give a false positive rate as close to zero as possible. Whenever a detection method generalizes to new instances, the tradeoff is for a higher false positive rate.

Unfortunately, traditional signature-based methods may not detect a new malicious executable. In an attempt to solve this problem, the anti-virus industry generates heuristic classifiers by hand. This process can be even more costly than generating signatures, so finding an automatic method to generate classifiers has been the subject of research in the anti-virus community. To solve this problem, different IBM researchers applied Artificial Neural Networks (ANNs) to the problem of detecting boot sector malicious binaries. (The method of detection is disclosed in G. Tesauro et al., "Neural Networks for Computer Virus Recognition, *IEE Expert,* 11(4):5-6, August 1996, which is incorporated by reference in its entirety herein.) An ANN is a classifier that models neural networks explored in human cognition. Because of the limitations of the implementation of their classifier, they were unable to analyze anything other than small boot sector viruses which comprise about 5% of all malicious binaries.

Using an ANN classifier with all bytes from the boot sector malicious executables as input, IBM researchers were able to identify 80-85% of unknown boot sector malicious executables successfully with a low false positive rate (<1%). They were unable to find a way to apply ANNs to the other 95% of computer malicious binaries.

In similar work, Arnold and Tesauro applied the same techniques to Win32 binaries, but because of limitations of the ANN classifier they were unable to have the comparable accuracy over new Win32 binaries. (This technique is described in Arnold et al.,: Automatically Generated Win 32 Heuristic Virus Detection," *Proceedings of the 2000 International Virus Bulletin Conference,* 2000, which is incorporated by reference in its entirety herein.)

The methods described above have the shortcoming that they are not applicable to the entire set of malicious executables, but rather only boot-sector viruses, or only Win32 binaries.

The technique is similar to data mining techniques that have already been applied to Intrusion Detection Systems by Lee et al. Their methods were applied to system calls and network data to learn how to detect new intrusions. They reported good detection rates as a result of applying data mining to the problem of IDS. A similar framework is applied to the problem of detecting new malicious executables. (The techniques are described in W. Lee et al., "Learning Patterns From UNIX Processes Execution Traces for Intrusion Detection, *AAAI Workshop in AI Approaches to Fraud Detection and Risk Management,* 1997, pages 50-56, and W. Lee et al., "A Data Mining Framework for Building Intrusion Detection Models," *IEEE Symposium on Security and Privacy,* 1999, both of which are incorporated by reference in their entirety herein.)

Procmail is a mail processing utility which runs under UNIX, and which filters email; and sorts incoming email according to sender, subject line, length of message, keywords in the message, etc. Procmail's pre-existent filter provides the capability of detecting active-content HTML tags to protect users who read their mail from a web browser or HTML-enabled mail client. Also, if the attachment is labeled as malicious, the system "mangles" the attachment name to prevent the mail client from automatically executing the attachment. It also has built in security filters such as long filenames in attachments, and long MIME headers, which may crash or allow exploits of some clients.

However, this filter lacks the ability to automatically update its list of known malicious executables, which may leave the system vulnerable to attacks by new and unknown viruses. Furthermore, its evaluation of an attachment is based solely on the name of the executable and not the contents of the attachment itself.

Accordingly, there exists a need in the art for a technique which is not limited to particular types of files, such as boot-sector viruses, or only Win32 binaries, and which provides the ability to detect new, previously unseen files.

SUMMARY

An object of the present invention is to provide a technique for predicting a classification of an executable file as malicious or benign which is not dependent upon the format of the executable.

Another object of the present invention is to provide a data mining technique which examines the entire file, rather than a portion of the file, such as a header, to classify the executable as malicious or benign.

A further object of the present invention is to provide an email filter which can detect executables that are borderline, i.e., executables having features indicative of both malicious and benign executables, which may be detrimental to the model if misclassified.

These and other objects of the invention, which will become apparent with reference to the disclosure herein, are accomplished by a system and methods for classifying an executable attachment in an email received by an email processing application or program, which includes filtering the executable attachment from said email. The email processing application may be executed at an email server or a client or host email application. A byte sequence feature is subsequently extracted from the executable attachment. The executable attachment is classified by comparing said byte sequence feature of the executable attachment with a classification rule set derived from byte sequence features of a set of executables having a predetermined class in a set of classes.

According to a preferred embodiment, extracting the byte sequence feature from said executable attachment comprises extracting static properties of the executable attachment, which are properties that do not require the executable to be run in order to discern. Extracting the byte sequence feature from the executable attachment may comprise converting the executable attachment from binary format to hexadecimal format. According to another embodiment, extracting the byte sequence features from the executable attachment may comprise creating a byte string representative of resources referenced by said executable attachment.

Advantageously, classifying the executable attachment may comprise predicting the classification of the executable attachment as one class in a set of classes consisting of malicious and benign. The set of classes may also include a borderline class. Classifying the executable attachment may comprise determining a probability or likelihood that the executable attachment is a member of each class in said set of classes based on said byte sequence feature. In one embodiment, this probability is determined by use of a Naive Bayes algorithm. In another embodiment, the probability may be determined by use of a Multi-Naive Bayes algorithm. The determination of the probability may be divided into a plurality of processing steps. These processing steps may then be performed in parallel. The executable attachment is classified as malicious if the probability that the executable attachment is malicious is greater than said probability that the executable attachment is benign. The executable attachment is classified as benign if the probability that the executable attachment is benign is greater than said probability that said executable attachment is malicious. The executable attachment is classified as borderline if a difference between the probability the executable attachment is benign and the probability the executable attachment is malicious is within a predetermined threshold.

A further step in accordance with the method may include logging the class of the executable attachment. The step of logging the class of the executable attachment may further include incrementing a count of the executable attachments classified as borderline. If the count of executable attachments classified as borderline exceeds a predetermined threshold, the system may provide a notification that the threshold has been exceeded.

In accordance with the invention, the objects as described above have been met, and the need in the art for a technique which can analyze previously unseen malicious executables, without regard to the type of file, has been satisfied.

BRIEF DESCRIPTION OF THE DRAWINGS

Further objects, features and advantages of the invention will become apparent from the following detailed description taken in conjunction with the accompanying figures showing illustrative embodiments of the invention, in which:

FIG. 2-4 illustrate a several approaches to binary profiling.

FIG. 5 illustrates sample classification rules determined from the features represented in FIG. 3.

FIG. 6 illustrates sample classification rules found by a RIPPER algorithm.

FIG. 7 illustrates sample classification rules found by a Naive Bayes algorithm.

Figure 1:
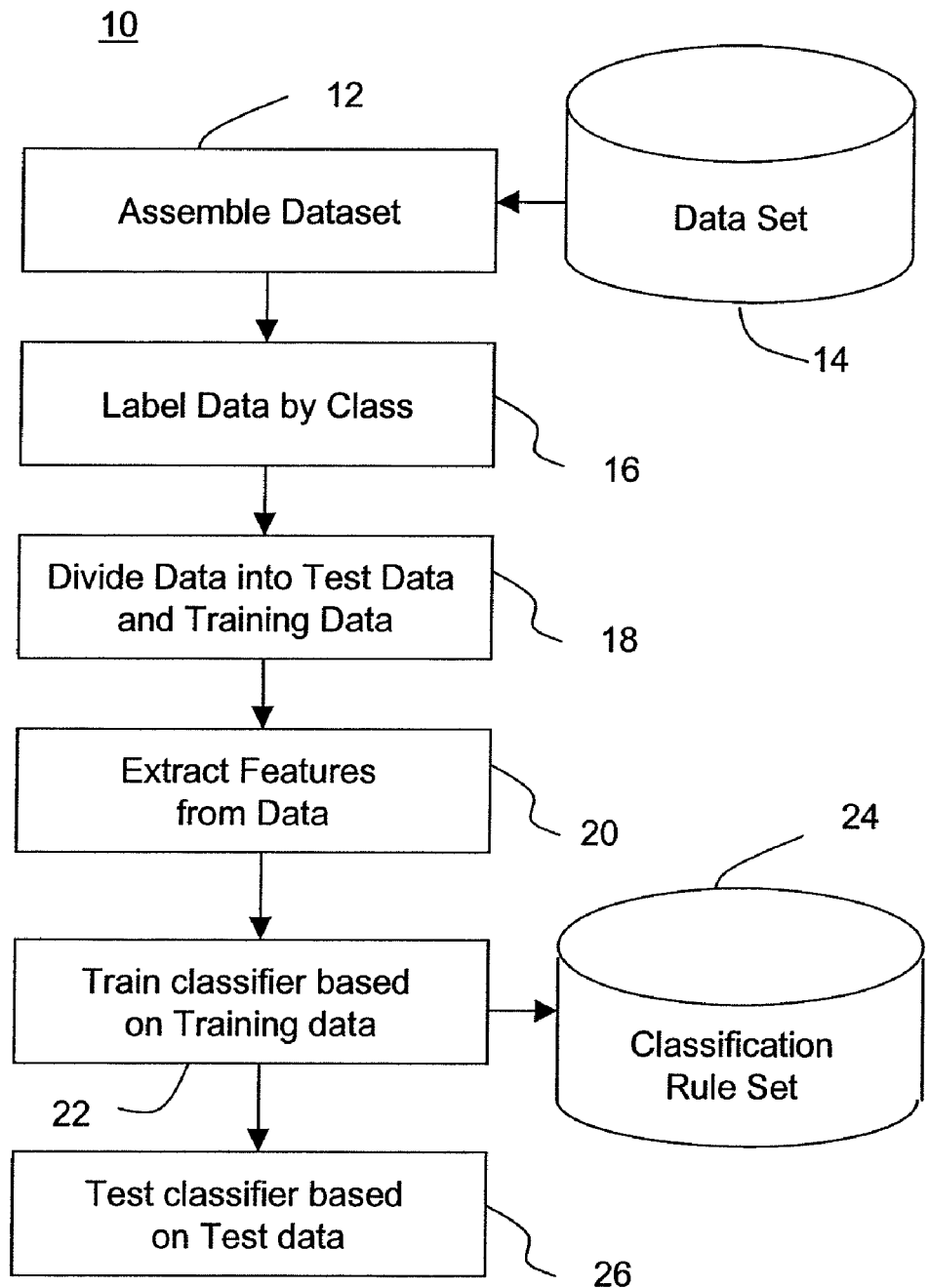
FIG. 1 is a flow chart illustrating an overview of a method of detection model generation in accordance with the present invention.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF EXEMPLARY EMBODIMENTS

This invention will be further understood in view of the following detailed description.

An exemplary system and methods for detecting malicious email attachments was implemented in UNIX with respect to Sendmail (a message transfer agent (MTA) which ensures messages get from source message servers to destination message servers for recipients to access their email, as produced by Sendmail, Inc. or Emeryville, Calif.). using Procmail (a publicly available program that processes e-mail messages received by the server, as further described in Stephen R. van den Berg and Philip Guenther, "Procmail," online publication as viewed on http://www.procmail.org, 2001). This system and methods uses data mining methods in order to create the detection model. The data mining methods are used to create classifiers to detect the malicious executables. A classifier is a classification rule set, or detection model, generated by the data mining algorithm that was trained over, i.e., derived from a given set of training data.

In accordance with the exemplary embodiment, a data mining-based filter integrates with Procmail's pre-existent security filter to detect malicious executable attachments. The filter uses a scoring system based on a data mining classifier to determine whether or not an attachment may be malicious. If an attachment's score is above a certain threshold it is considered malicious. The data mining classifier provides the ability to detect both the set of known malicious executables and a set of previously unseen, but similar malicious executables.

A flowchart illustrating the process 10 of creating of the classification rule set is illustrated in FIG. 1. An early stage in the process is to assemble the dataset (step 12) which will be used for training, and for optionally testing the detection model. In the exemplary embodiment, this step included gathering a large set of executables 14 from public sources. In addition, each example program in the data set is a Windows or MS-DOS format executable, although the framework is applicable to other formats. In the exemplary embodiment, the programs were gathered either from FTP sites, or personal computers in the Data Mining Lab at Columbia University. A total of 4,031 programs were used.

In a subsequent stage, each data item, or executable, is labeled by class (step 16). The learning problem in the exemplary embodiment is defined with two classes, e.g., malicious and benign. As discussed above, a malicious executable is defined to be a program that performs a malicious function, such as compromising a system's security, damaging a system, or obtaining sensitive information without the user's permission. A benign program does not perform such malicious functions. Thus, the data set was divided into two groups: (1) malicious and (2) benign executables. In order to train the classification rule set, the classes of the executables must be known in advance. Of the 4,031 programs used in the data set, 3,301 were malicious executables and 1,000 were benign executables. The malicious executables consisted of viruses, Trojans, and cracker/network tools. There were no duplicate programs in the data set To standardize the data-set, an updated MacAfee' s virus scanner, produced by McAfee.com Corporation of Sunnyvale, Calif., was used to label the programs as either malicious or benign executables. All labels were assumed to be correct for purposes of the analysis.

Another step, which may be performed concurrently with or subsequent to the above step, is to divide the dataset into two subsets which include a training set and a test set (step 18). The data mining algorithms use the training set to generate the classification rule sets. After training, a test set may be used to test the accuracy of the classifiers on a set of unseen examples. It is understood that testing the detection model is an optional step to determine the accuracy of the detection model, and, as such, may be omitted from the process.

The next step of the method is to extract features from each executable (Step 20). Features in a data mining framework are defined as properties extracted from each example program in the data set, e.g., byte sequences, that a classifier uses to generate detection models. (Signatures, as distinguished from features, typically refer to a specific feature value, while a feature is a property or attribute of data (such as "byte sequence feature") which may take on a set of values. Signature based methods are methods that inspect and test data to determine whether a specific feature value is present in that data, and then classify or alarm accordingly.) In the present invention, the presence of specific feature values is used by the learning algorithms to calculate a probability or likelihood of classification of the data. The features which are extracted in the exemplary embodiment are static properties, which are properties that do not require executing the binary in order to be detected or extracted.

In the exemplary embodiment, hexdump was used in the feature extraction step. Hexdump, as is known in the art (Peter Miller, "Hexdump," on line publication 2000, http://gd.tuwien.ac.at/softeng/Aegis/hexdump.html which is incorporated by reference in its entirety herein), is an open source tool that transforms binary files into hexadecimal files. The byte sequence feature is informative because it represents the machine code in an executable. After the "hexdumps" are created, features are produced in the form illustrated in FIG. 2 in which each line represents a short sequence of machine code instructions. In the analysis, a guiding assumption is made that similar instructions were present in malicious executables that differentiated them from benign programs, and the class of benign programs had similar byte code that differentiated them from the malicious executables. Each byte sequence in the program is used as a feature.

Many additional methods of feature extraction are also useful to carry out step 20, above, and are described herein. For example, octale encoding may be used rather than hexadecimal encoding. According to another approach to feature extraction is to extract resource information from the binary that provides insight to its behavior, which is also referred to herein as "binary profiling." According to this approach, a subset of the data may be examined which is in Portable Executable (PE) format (which is described in "Portable Executable Format," online publication as viewed on, http://support.microsoft.com/support/kb/articles/Q121/4/60.asp, 1999, which is incorporated by reference in its entirety herein.) For instance, an executable in a standard Windows user interface may normally call the User Interfaces Dynamically Linked Library (USER32.DLL). This approach assumes that if an executable being evaluated does not call USER32.DLL, then the program does not have the standard Windows user interface. To extract resource information from Windows executables, GNU's Bin-Utils may be used (as described in "GNU Binutils Cygwin, online publication as viewed on http://sourceware.cygnus.com/cygwin, 1999, which is incorporated by reference in its entirety herein). GNU's Bin-Utils suite of tools can analyze PE binaries within Windows. In PE, or Common Object File Format (COFF), program headers are composed of a COFF header, an Optional header, at MS-DOS stub, and a file signature. All of the information about the binary is obtained from the program header without executing the unknown program but by examining the static properties of the binary, using libBFD, which is a library within Bin-Utils, to extract information in object format. Object format for a PE binary gives the file size, the names of DLLs, and the names of function calls within those DLLs and Relocation Tables. From the object format, it is possible to extract a set of features to compose a feature vector, or string, for each binary representative of resources referenced by the binary.

Figures 2, 3, 4, 5:
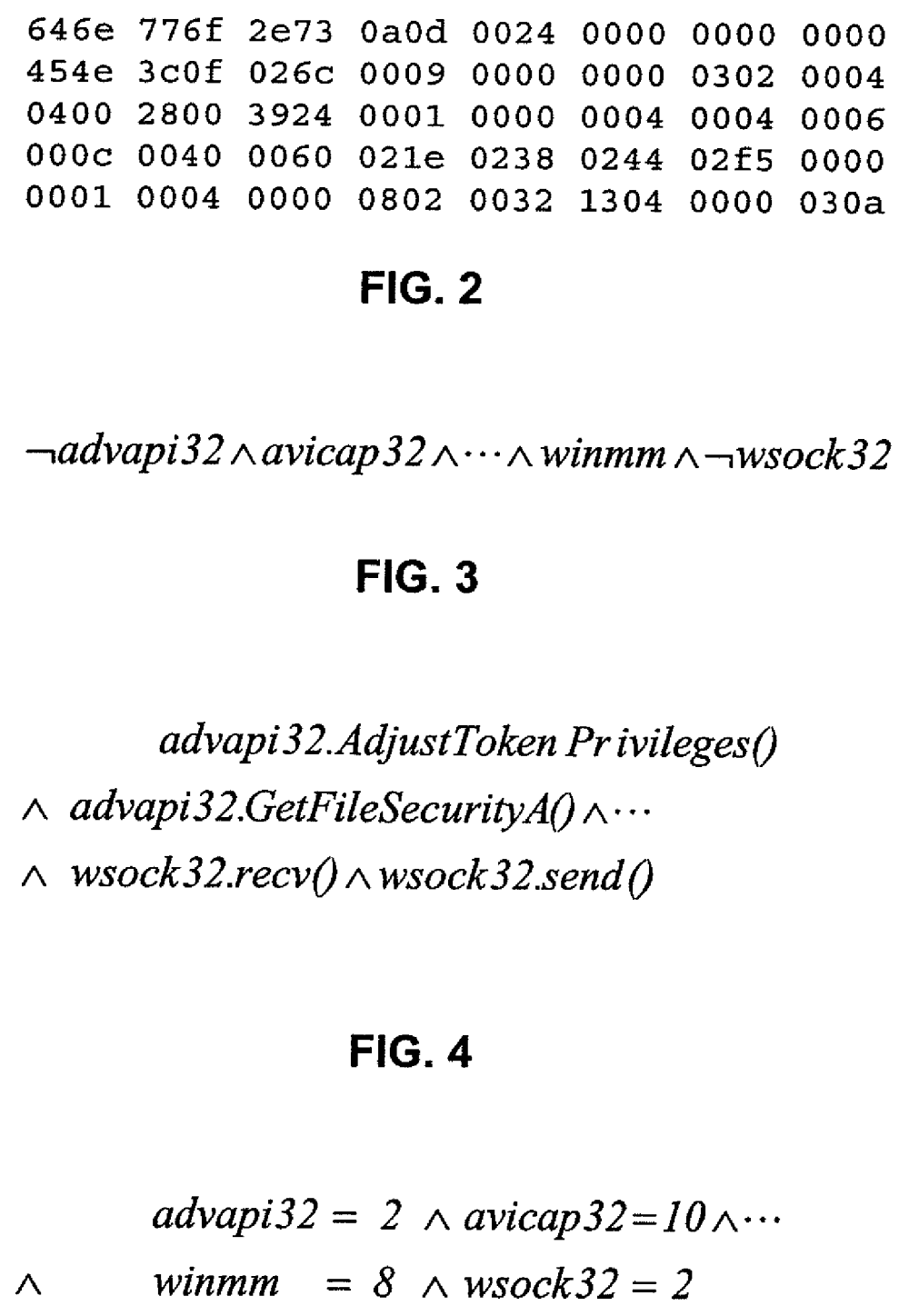

Three types of features may be analyzed to determine how resources affect a binary's behavior:
1. The list of DLLs used by the binary
2. The list of DLL function calls made by the binary
3. The number of different function calls within each DLL A first approach to binary profiling used the DLLs loaded by the binary as features. Data can be modeled by extracting a feature or a set of features, and each set of features may be represented as a vector of feature values. The feature vector comprised of a number of boolean values, e.g., 30, representing whether or not a binary used a DLL. Typically, not every DLL was used in all of the binaries, but a majority of the binaries called the same resource. For example, almost every binary called GDI32.DLL, which is the Windows NT Graphics Device Interface and is a core component of WinNT. The example vector given in FIG. 3 is composed of at least two unused resources: ADVAP132.DLL, the Advanced Windows API, and WSOCK32.DLL, the Windows Sockets API. It also uses at least two resources: AVI-CAP32.DLL, the AVI capture API, and WINNM.DLL, the Windows Multimedia API.

A second approach to binary profiling uses DLLs and their function calls as features. This approach is similar to the first, described above, but with added function call information. The feature vector is composed of a greater number, e.g., 2,229, of boolean values. Because some of the DLL's had the same function names it was important to record which DLL the function came from. The example vector given in FIG. 4 is composed of at least four resources. Two functions were called in AD-VAP132.DLL: AdjustTokenPrivileges( ) and GetFileSecurityA( ), and two functions were called in WSOCK32.DLL: recv( ) and send( ).

A third approach to binary profiling counts the number of different function calls used within each DLL, and uses such counts as features. The feature vector included several, e.g., 30, integer values. This profile provides an approximate measure of how heavily a DLL is used within a specific binary. This is a macro-resource usage model because the number of calls to each resource is counted instead of detailing referenced functions. For example, if a program only called the recv( ) and send( ) functions of WSOCK32.DLL, then the count would be 2. It should be noted that this third approach does not count the number of times those functions might have been called. The example vector given in FIG. 5 describes an example that calls two functions in ADVAPI32.DLL, ten functions in AVICAP32.DLL, eight functions in WINNM.DLL, and two functions from WSOCK32.DLL.

Another method useful for feature extraction (step 20) does not require PE format for the executables, and therefore is applicable to Non-PE executables. Headers in PE format are in plain text, which allows extraction of the same information from the PE executables by extracting the plain text headers. Non-PE executables also have strings encoded in them. This information is used to classify the entire data set, rather than being limited only to the subset of data including libBFD, described above. To extract features from the data set according to this third method, the GNU strings program was used. The strings program extracts consecutive printable characters from any file. Typically there are many printable strings in binary files. Some common strings found in the dataset are illustrated in Table 1.

TABLE 1

| | | | |
|---|---|---|---|
| kernel | microsoft | windows | getmodulehandlea |
| getversion | getstartupinfoa | win | getmodulefilenamea |
| messageboxa | closehandle | null | dispatchmessagea |
| library | getprocaddress | advapi | getlasterror |
| loadlibrarya | exitprocess | heap | getcommandlinea |
| reloc | createfilea | writefile | setfilepointer |
| application | showwindow | time | regclosekey |

Through testing it was observed that similar strings were present in malicious executables that distinguished them from benign programs, and similar strings in benign programs that distinguished them from malicious executables. According to this technique, each string in the binary was used as a feature for the classifier.

Once the features were extracted using hexdump, or any other feature extraction method, such as those described herein, a classifier was trained to label a program as malicious or benign (Step 22). The classifier computes the probability or likelihood that a program is a member of a certain classification given the features or byte strings that are contained in that program. (Throughout the description herein, the term "probability" will generally refer to probability or likelihood, except where specified.)

In the exemplary embodiment, the classifier was a Naive Bayes classifier that was incorporated into Procmail, as will be described in greater detail herein. A Naive Bayes classifier is one exemplary machine learning algorithm that computes a model of a set of labeled training data and subsequently may use that model to predict the classification of other data. Its output is a likelihood (based on mathematical probability theory) associated with each classification possible for the other data. The Naive Bayes algorithm computes the likelihood that a program is a member each classification, e.g., malicious and benign, given the features or byte strings that are contained in that program. For instance, if a program contained a significant number of malicious byte sequences and a few or no benign sequences, then it labels that binary as malicious. Likewise, a binary that was composed of many benign features and a smaller number of malicious features is labeled benign by the system. In accordance with the invention, the assumption was made that there were similar byte sequences in malicious executables that differentiated them from benign programs, and the class of benign programs had similar sequences that differentiated them from the malicious executables.

In particular, the Naive Bayes algorithm first computes (a) the probability that a given feature is malicious and (b) the probability that the feature is benign, by computing statistics on the set of training data. Then to predict whether a binary, or collection of hex strings, was malicious or benign, those probabilities were computed for each hex string in the binary, and then the Naive Bayes independence assumption was used. The independence assumption was applied in order to efficiently compute the probability that a binary was malicious and the probability that the binary was benign.

Specifically, the Naive Bayes algorithm computes the class C of a program, given that the program contains a set of features F. (The Naive Bayes algorithm is described, for example, in T. Mitchell, "Naive Bayes Classifier," *Machine Learning*, McGraw-Hill, 1997, pp. 177-180, which is incorporated by reference in its entirety herein.) The term C is defined as a random variable over the set of classes: benign and malicious executables. That is, the classifier computes P(C|F), the probability that a program is in a certain class C given the program contains the set of features F. According to the Bayes rule, the probability is expressed in equation (1):

$$P(C \mid F) = \frac{P(F \mid C) * P(C)}{P(F)} \quad (1)$$

To use the Naive Bayes rule, it is assumed that the features occur independently from one another. If a program F include the features $F_1, F_2, F_3, \ldots, F_n$, then equation (1) may be re-written as equation (2). (In this description, subscripted features $F_x$ refers to a set of code strings.)

$$P(C\mid F)=\frac{\prod_{i=1}^{n} P(F_i\mid C)*P(C)}{\prod_{j=1}^{n} P(F_j)} \quad (2)$$

Each $P(F_i|C)$ is the frequency that feature string $F_i$ occurs in a program of class C. P(C) is the proportion of the class C in the entire set of programs.

The output of the classifier is the highest probability class for a given set of strings. Since the denominator of equation (1) is the same for all classes, the maximum class is taken over all classes C of the probability of each class computed in (2) to get equation (3):

$$\text{Most Likely Class} = \underset{C}{\max}\left(P(C)\prod_{i=1}^{n} P(F_i\backslash C)\right) \quad (3)$$

In equation (3), the term $\max_c$ denotes the function that returns the class with the highest probability. "Most Likely Class" is the class in C with the highest probability and hence the most likely classification of the example with features F.

To train the classifier, a record was made for how many programs in each class contained each unique feature. This information was used to classify a new program into an appropriate class. Feature extraction, as described above, was used to determine the features contained in the program. Then, equation (3) was applied to compute the most likely class for the program.

The Naive Bayes method is a highly effective technique, but also requires significant amounts of main memory, such as RAM, e.g., greater than 1 gigabyte, to generate a detection model when the data or the set of features it analyzes is very large. To make the algorithm more efficient, the problem may be divided into smaller pieces that would fit in memory and generate a classifier for each of the subproblems. For example, the subproblem was to classify based on 16 subsets of the data organized according to the first letter of the hex string. This data mining algorithm is referred to as "Multi-Naive Bayes." This algorithm was essentially a collection of Naive Bayes algorithms that voted on an overall classification for an example. The Multi-Naive Bayes calculations are advantageously executed in a parallel and distributed computing system for increased speed.

According to this approach, several Naive Bayes classifiers may be trained so that all hex strings are trained on. For example, one classifier is trained on all hex strings starting with an "A", and another on all hex strings starting with an "0". This is done 16 times and then a voting algorithm is used to combine their outputs. Each Naive Bayes algorithm classified the examples in the test set as malicious or benign, and this counted as a vote. The votes are combined by the Multi-Naive Bayes algorithm to output a final classification for all the Naive Bayes.

According to the exemplary embodiment, the data may be divided evenly into several sets, e.g. six sets, by putting each ith line in the binary into the (i mod n)th set where n is the number of sets. For each set, a Naive Bayes classifier is trained. The prediction for a binary is the product of the predictions of the n classifiers. In the exemplary embodiment, 6 classifiers (n=6) were used.

More formally, the Multi-Naive Bayes promotes a vote of confidence between all of the underlying Naive Bayes classifiers. Each classifier determines a probability of a class C given a set of bytes F which the Multi-Naive Bayes uses to generate a probability for class C given features F over all the classifiers.

The likelihood of a class C given feature F and the probabilities learned by each classifier NaiveBayes$_i$ are determined. In equation (4) the likelihood $L_{NB}(C|F)$ of class C given a set of feature F was computed:

$$L_{NB}(C\backslash F)=\prod_{i=1}^{|NB|} P_{NB_i}(C\backslash F)/P_{NB_i}(C) \quad (4)$$

where $NB_i$ is a Naive Bayes classifier and NB is the set of all combined Naive Bayes classifiers (in this case 6). $P_{NBi}(C|F)$ (generated from equation (2)) is the probability for class C computed by the classifier NaiveBayes$_i$ given F divided by the probability of class C computed by NaiveBayes$_i$. Each $P_{NBi}(C|F)$ was divided by $P_{NBi}(C)$ to remove the redundant probabilities. All the terms were multiplied together to compute $L_{NB}(C|F)$, the final likelihood of C given F. |NB| is the size of the set NB such that $\Box NB_i \in NB$.

The output of the multi-classifier given a set of bytes F is the class of highest probability over the classes given $L_{NB}(C|F)$ and $P_{NB}(C)$ the prior probability of a given class, which is represented by equation (5), below.

$$\text{Most Likely Class} = \underset{C}{\max}(P_{NB}(C)*L_{NB}(C\backslash F)) \quad (5)$$

Most Likely Class is the class in C with the highest probability hence the most likely classification of the example with features F, and $\max_c$ returns the class with the highest likelihood.

Additional embodiments of classifiers are described herein, which are also useful to classify an executable as benign or malicious. Alternatively, inductive rule learners may be used as classifiers. Another algorithm, RIPPER, is an inductive rule learner (RIPPER is described in W. Cohen, "Learning Trees and Rules with Set-Valued Features," *American Association for Artificial Intelligence*, 1996, which is incorporated by reference in its entirety herein). This algorithm generates a detection model composed of resource rules that was built to detect future examples of malicious executables. RIPPER is a rule-based learner that builds a set of rules that identify the classes while minimizing the amount of error. The error is defined by the number of training examples misclassified by the rules. This algorithm may be used with libBFD information as features, which were described above.

As is known in the art, an inductive algorithm learns what a malicious executable is, given a set of training examples. Another useful algorithm for building a set of rules is Find-S. Find-S finds the most specific hypothesis that is consistent with the training examples. For a positive training example the algorithm replaces any feature in the hypothesis that is inconsistent with the training example with a more general feature. For example, four features seen in Table 2 are:

1. "Does it have a GUI?"
2. "Does it perform a malicious function?"

3. "Does it compromise system security?"
4. "Does it delete files?"
and finally the classification label "Is it malicious?"

TABLE 2

|   | Has a GUI? | Malicious Function? | Compromise Security? | Deletes Files? | Is it malicious? |
|---|---|---|---|---|---|
| 1 | yes | yes | yes | no | yes |
| 2 | no | yes | yes | yes | yes |
| 3 | yes | no | no | yes | no |
| 4 | yes | yes | yes | yes | yes |

The defining property of any inductive learner is that no a priori assumptions have been made regarding the final concept. The inductive learning algorithm makes as its primary assumption that the data trained over is similar in some way to the unseen data.

A hypothesis generated by an inductive learning algorithm for this learning problem has four features. Each feature will have one of these values:
1. T, truth, indicating any value is acceptable in this position,
2. a value, either yes, or no, is needed in this position, or
3. a $\bot$, falsity, indicating that no value is acceptable for this position.

For example, the hypothesis $\langle T, T, T, T \rangle$ and the hypothesis (yes, yes, yes, no) would make the first example in Table 2 true. $\langle T, T, T, T \rangle$ would make any feature set true and $\langle$yes, yes, yes, no$\rangle$ is the set of features for example one.

Of all the hypotheses, values 1 is more general than 2, and 2 is more general than 3. For a negative example, the algorithm does nothing. Positive examples in this problem are defined to be the malicious executables and negative examples are the benign programs.

The initial hypothesis that Find-S starts with is $\langle \bot, \bot, \bot, \bot \rangle$. This hypothesis is the most specific because it is true over the fewest possible examples, none. Examining the first positive example in Table 2, $\langle$yes, yes, yes, no$\rangle$, the algorithm chooses the next most specific hypothesis $\langle$yes, yes, yes, no$\rangle$. The next positive example, $\langle$no, no, no, yes$\rangle$, is inconsistent with the hypothesis in its first and fourth attribute ("Does it have a GUI?" and "Does it delete files?") and those attributes in the hypothesis get replaced with the next most general attribute, T.

The resulting hypothesis after two positive examples is $\langle T,$ yes, yes, T$\rangle$. The algorithm skips the third example, a negative example, and finds that this hypothesis is consistent with the final example in Table 2. The final rule for the training data listed in Table 2 is $\langle T,$ yes, yes, T$\rangle$. The rule states that the attributes of a malicious executable, based on training data, are that it has a malicious function and compromises system security. This is consistent with the definition of a malicious executable stated above. Thus, it does not matter in this example if a malicious executable deletes files, or if it has a GUI or not.

RIPPER looks at both positive and negative examples to generate a set of hypotheses that more closely approximate the target concept while Find-S generates one hypothesis that approximates the target concept.

Each of the data mining algorithms generated its own classification rule set 24 to evaluate new examples. The classification rule sets are incorporated in the filter to detect malicious executables, as will be described below in the exemplary embodiment. For purposes herein, a classification rule set is considered to have the standard meaning in data mining terminology, i.e., a set of hypotheses that predict the classification, e.g., malicious or benign, of an example, i.e., an executable, given the existence of certain features. The Naive Bayes rules take the form of P(F|C), the probability of an feature F given a class C. The probability for a string occurring in a class is the total number of times it occurred in that class's training set divided by the total number of times that the string occurred over the entire training set. An example of such hypotheses are illustrated in FIG. 7. Here, the string "windows" was predicted to more likely occur in a benign program and string "*.COM" was more than likely in a malicious executable program.

This approach compensates for those instances where a feature, e.g., a hex string, occurs in only one class in the training data. When this occurs, the probability is arbitrarily increased from 0/n, where n is the number of occurrences, to 1/n. For example, a string (e.g. "AAAA") may occur in only one set, e.g., in the malicious executables. The probability of "AAAA" occurring in any future benign example is predicted to be 0, but this is an incorrect assumption. If a program was written to print out "AAAA" it will always be tagged a malicious executable even if it has other strings in it that would have labeled it benign. In FIG. 6, the string "*.COM" does not occur in any benign programs so the probability of "*.COM" occurring in class benign is approximated to be 1/12 instead of 0/11. This approximates real world probability that any string could occur in both classes even if during training it was only seen in one class.

The rule sets generated by the Multi-Naive Bayes algorithm are the collection of the rules generated by each of the component Naive Bayes classifiers. For each classifier, there is a rule set such as the one in FIG. 6. The probabilities in the rules for the different classifiers may be different because the underlying data that each classifier is trained on is different. The prediction of the Multi-Naive Bayes algorithm is the product of the predictions of the underlying Naive Bayes classifiers.

RIPPER's rules were built to generalize over unseen examples so the rule set was more compact than the signature-based methods. For the data set that contained 3,301 malicious executables the RIPPER rule set contained the five rules in FIG. 6.

Here, a malicious executable was consistent with one of four hypotheses:
1. it did not call user32.EndDialog( ) but it did call kernel32.EnumCalendarInfoA( )
2. it did not call user32.LoadIconA( ), kernel32.GetTempPathA( ), or any function in advapi32.dll
3. it called shell32.ExtractAssociatedIconA( ),
4. it called any function in msvbbm.dll, the Microsoft Visual Basic Library A binary is labeled benign if it is inconsistent with all of the malicious binary hypotheses in FIG. 6.

Each data mining algorithm generated its own rule set 24 to evaluate new examples. The detection models are stored for subsequent application to classify previously unseen examples, as will be described below. An optional next step is to test the classification rule set 24 against the test data (step 26). This step is described in greater detail below.

Figure 8:
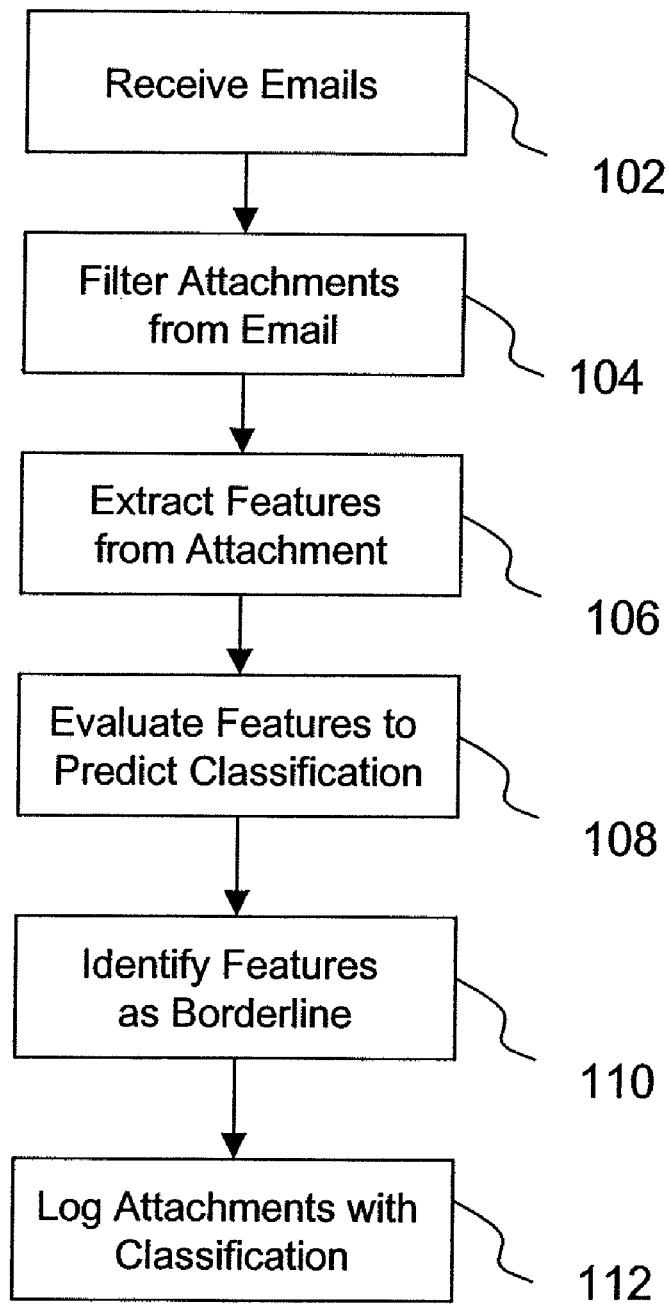
FIG. 8 is a flow chart illustrating a method of detecting malicious executables in accordance with the present invention.

The process 100 of detecting malicious emails in accordance with the invention is illustrated in FIG. 8. A first step is to receive the emails at the server (step 102). In the exemplary embodiment, the mail server is Sendmail. Procmail is a publicly available program that processes e-mail messages received by the server and looks for particular information in the headers or body of the message, and takes action on what it finds.

Subsequently, the emails are filtered to extract attachments or other components from the email (step 104). The executable attachments may then be saved to a file. In the exemplary embodiment, html_trap.procmail, a commonly-available routine, has been modified to include a call to a novel routine, parser3, which performs the functions of filtering attachments. The routine parser3 includes a call to the routine extractAttachments, for example, which extracts executable attachments and other items of the email and saves them to a file, e.g., $files_full_ref, and also provides a string containing a directory of where the executable attachments are saved, e.g., $dir, and a reference to an array containing a list of the file names, e.g., $files_ref.

Features in the executable attachment are extracted (step 106), and those features are subsequently analyzed and used to classify the executable attachment as malicious or benign. In the exemplary embodiment, the routine parser3 also includes a call to the routine scanAttachments, which in turn calls the routine hexScan, which performs the feature extraction of step 106. In particular, hexScan includes a function call to hexdump, a commonly-available routine which transforms the binary files in the attachment into a byte sequence of hexadecimal characters, as described above and illustrated in FIG. 2. The resulting hexadecimal string is saved as "/tmp/$$.hex," These strings of hexadecimal code are the "features" which are used in the classification, described below. This byte sequence is useful because it represents the machine code in an executable. In addition, this approach involves analyzing the entire binary, rather than portions such as headers, an approach which consequently provides a great deal of information about the executable. It is understood that the feature extraction step described herein is alternatively performed with a binary profiling method in another embodiment, as described above and illustrated in FIGS. 3-4, and with a GNU strings method, also described above and illustrated in Table 1. In these embodiments, the step of calling the routine hexScan in scanAttachments is replaced by calls to routines that perform the binary profiling or GNU strings analysis.

The features extracted from the attachment in step 106 are evaluated using the classification rule set as described above, and the attachment is classified as malicious or benign (step 108). In the exemplary embodiment, the routine hexScan subsequently calls the routine senb, which calculates "scores" associated with the attachments. (As will be described below, such scores are representative of whether a binary is malicious or benign.) The routine senb evaluates the features, e.g., the hexadecimal string "/tmp/$$.hex" produced by hexdump against the rules in the Classification Rule Set, e.g., "/etc/procmail/senb/aids_model.txt," and returns with a first score associated with the probability that the string is malicious and a second score associated with the probability that the string is benign. In order to obtain these scores, the routine senb invokes the routine check_file, which performs the Naive Bayes analysis on the features as described above in equation (1)-(5), and calculates scores associated with the probability that the program is malicious and benign. Where the Multi-Naive Bayes algorithm is used, the data is partitioned into components which are processed in parallel to increase processing speed. The routine hexScan then determines which of the scores is greater, e.g., malicious or benign. In other embodiments, a different classification algorithm may be implemented, such as a function call to the RIPPER algorithm which will evaluate the features extracted in step 106 to determine whether they are malicious or benign.

A further step may be to identify the programs as borderline (step 110). Borderline executables are defined herein as programs that have similar probabilities of being benign and malicious (e.g., 50% chance it is malicious, and 50% chance it is benign; 60% chance malicious and 40% chance benign; 45% chance malicious and 55% chance benign, etc.). Due to the similar probabilities, borderline executables are likely to be mislabeled as either malicious or benign. Since borderline cases could potentially lower the detection and accuracy rates by being misclassified, it is desirable to identify these borderline cases, properly classify them as malicious or benign, and update the classification rule set to provide increased accuracy to the detection of malicious executables. The larger the data set that is used to generate models, then the more accurate the detection models will be. To execute this process, the system identifies programs as borderline using the criteria described below, and archives the borderline cases. At periodic intervals, the system sends the collection of these borderline cases to a central server, by the system administrator. Once at a central repository, such as data repository 244, these binaries can then be analyzed by experts to determine whether they are malicious or not, and subsequently included in the future versions of the detection models. Preferably, any binary that is determined to be a borderline case will be forwarded to the repository and wrapped with a warning as though it were a malicious attachment.

A exemplary metric to identify borderline cases, which may be implemented in hexScan or a similar routine is to define a borderline case to be a case where the difference between the probability, or score, that the program is malicious and the probability, or score, it is benign is below a threshold. This threshold may be set based on the policies of the host. For example, in a secure setting, the threshold could be set relatively high, e.g., 20%. In this case, all binaries that have a 60/40 split are labeled as borderline. In other words, binaries with a 40-60% chance (according to the model) of being malicious and 40-60% chance of being benign would be labeled borderline. This setting can be determined by the system administrator. An exemplary default setting of 51.25/48.75 may be used with a threshold of 2.5%, which was derived from testing.

The routine scanAttachments receives the output of hexScan which is a determination of whether the program is malicious or benign, and assigns the string a boolean "0" or "1." (Where the probabilities of being malicious and of being benign are similar, it may be labeled borderline, as discussed above.) Subsequently, scanAttachments invokes the routine md5log to associate a unique identifier for each attachment in by using the MD5 algorithm, (as described in R. Rivest, "The MD5 Message Digest Algorithm," *Internet RFC*1321, Paril 1992, which is incorporated by reference in its entirety herein.) The input to MD5 is the hexadecimal representation of the binary. These identifiers are than kept in a log along with other information such as whether the attachment was malicious, benign, or borderline and with what certainty the system made those predictions (Step 112).

The results of this analysis are sent from parser3 to html-trap.procmail, which inserts warnings that the file may be malicious and may quarantine the attachment. The routine html-trap.procmail reintegrates filtered email back into normal email traffic.

Figure 9:
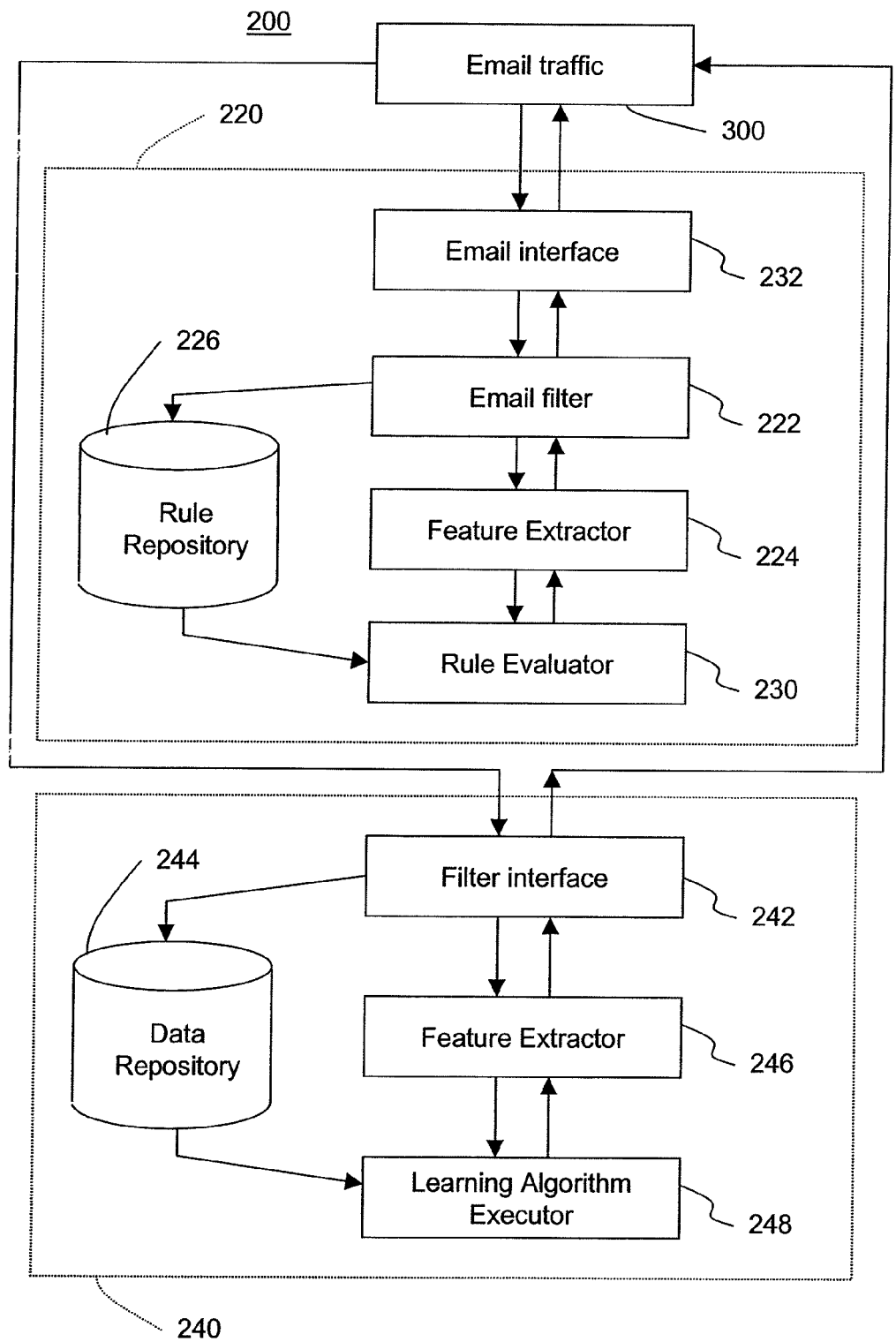
FIG. 9 is a simplified diagram illustrating the architecture of the malicious email detector and model generator in accordance with the present invention.

An exemplary system 200 in accordance with the invention is illustrated in FIG. 9. The system 200 includes a malicious email detector 220 and model generator 240. The system may resides on the server of a computer or on a host or client of the computer system to receive emails before they are forwarded to users of the system.

The malicious email detector may include an email filter 222, a feature extractor 224, a rule repository 226, a rule evaluator 230, and an email interface 232. In the exemplary embodiment, the email filter 222 may include the routine Parser3 which filters attachments from the emails as described above. Parser3 calls the routine extractAttachments, for example, which extracts attachments and other items of the email. The email filter 222 may also filter out updated classification rules sent by the model generator 240, and forward them to the rule repository 226.

The feature extractor 224 receives the executable attachments and extracts those byte sequence features which will be analyzed and used to classify the program as malicious or benign. In the exemplary embodiment, the routine scanAttachments calls the routine hexScan, which performs the function of the feature extractor 224. In particular, hexScan includes a function call to hexdump, which transforms the binary files into hexadecimal strings. The rule repository 226 may be a database which contains the classification rule set generated by a data mining model in a process such as that illustrated in FIG. 1. The rule evaluator 230 evaluates the byte sequence features extracted from the attachments by the feature extractor 224 using the classification rule set provided by the rule repository 226.

In the exemplary embodiment, the routine hexScan calls the routine senb, which performs the function of rule evaluator 230. The routine senb evaluates the byte sequence features, e.g., the hexadecimal string against the classification rule set in the rule repository 26, e.g., "/etc/procmail/senb/aids_model.txt," and returns with a score that the string is malicious and a score that the string is benign. The rule evaluator 230 may also provide an indication that the string is borderline.

The results of this analysis may be sent to the email interface 232, which reintegrates filtered email back into normal email traffic 300, and which may send the model generator 240 (described below) each attachment to be analyzed further. If the program was considered malicious by the rule evaluator 230, the email interface 232 may add warnings to the email or quarantine the email. In the exemplary embodiment, the routine html-trap.procmail performs this function.

Figure 10:
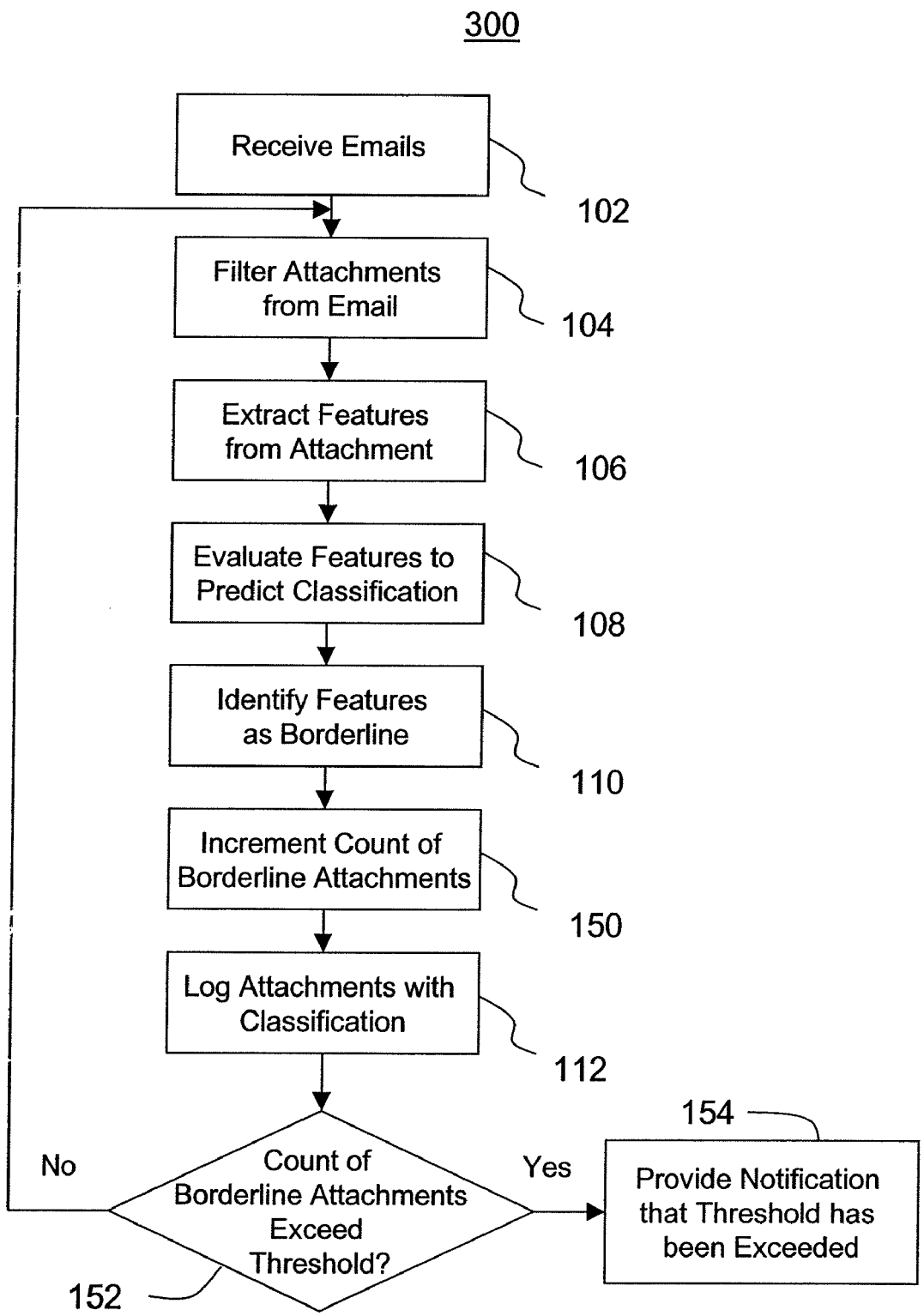
FIG. 10 is a flow chart, similar to FIG. 8, illustrating another method of detecting malicious executables in accordance with the present invention.

The classification rule set may require updates periodically. For example, after a number of borderline cases have been identified by the rule evaluator 230, it may be desirable to generate a new detection model, and subsequently distribute the updated models. This embodiment of the system 300, which is illustrated in FIG. 10, is substantially identical to system 100, with the differences noted herein. For example, the email filter 222 may maintain a running counter of the number of borderline executables identified (step 150 of FIG. 9). When a predetermined threshold is exceeded (proportional to the overall traffic of email received) (step 152 of FIG. 9), a notification may be sent that the threshold has been exceeded (step 154 of FIG. 9). Subsequently, the model generator 240 may be invoked to generate an updated classification rule set A new classification rule set is generated at the model generator 240 by running the data mining algorithm on the new data set that contains the borderline cases along with their correct classification (as determined by expert analysis), and the existing training data set. As described herein, the data mining algorithm may be a Naive Bayes or a Multi-Naive Bayes algorithm, or any other appropriate algorithm for calculating the probability or likelihood that a feature is a member of a class. When the Multi-Naive Bayes analysis is used herein, the data is partitioned into several components and all the components may be processed in parallel to increase speed. This updated model may then be distributed to the malicious email detector 220. The filter interface 242 may receive copies of all attachments from the email interface 232. In the exemplary embodiment, the routine senb may perform the function of the filter interface 242. The data repository 244 receives copies of attachments from the filter interface 42, and stores the attachments. In the exemplary embodiment, the attachments may be stored as a datafile.

The feature extractor 246 accesses attachments stored in the data repository 244, and then extracts features from the attachments. This function may be performed by invoking the hexdump routine, as described above. The learning algorithm executor 248 receives features from the feature extractor 246 and executes learning algorithms on the features extracted from the attachments to generate an updated classification rule set. In the exemplary embodiment, the routine senb calls the routine test_table, which in turn invokes test_class. Test_class invokes test_file, which performs the function of creating the updated classification rule set, including performing the Naive Bayes calculations, described above in equations (1)-(5).

In an exemplary embodiment, the filter interface 242 receives the classification model rule set from the learning algorithm executor 248 and transmits the classification model rule set to the malicious email detector 220, where it is used to update the classification rule set stored in the rule depository 226. According to the exemplary embodiment, portions of the classification model rule set that have changed may be distributed, rather than the entire classification model rule set, to improve efficiency. In order to avoid constantly sending a large model from the model generator 240 to the malicious email detector 220, the administrator is provided with the option of receiving this smaller file. Using the update algorithm, the older model can then be updated. The full model will also be available to provide additional options for the system administrator. Efficient update of the model is possible because the underlying representation of the models is probabilistic. Thus, the model is a count of the number of times that each byte string appears in a malicious program versus the number of times that it appears in a benign program. An update model can then be easily summed with the older model to create a new model. From these counts the algorithm computes the probability that an attachment is malicious in a method described above. In order to combine the models, the counts of the old model are summed with the new information.

As shown in Table 3, in model A, the old detection model, a byte string occurred 99 times in the malicious class, and one time in the benign class. In model B, the update model, the same byte string was found three times in the malicious class and four times in the benign class. The combination of models A and B would state that the byte string occurred 102 times in the malicious class and five times in the benign class. The combination of A and B would be the new detection model after the update.

TABLE 3

Model A (old)

The byte string occurred in 99 malicious executables
The byte string occurred in 1 benign executable TABLE 3-continued Model B (new)

The byte string occurred in 3 malicious executables
The byte string occurred in 4 benign executables.
Model C (update)

The byte string occurred in 102 malicious executables
The byte string occurred in 5 benign executables.

To compare the results of the methods and system described herein with traditional methods, a prior art signature-based method was implemented (step 26, of FIG. 1). First, the byte-sequences that were only found in the malicious executable class were calculated. These byte-sequences were then concatenated together to make a unique signature for each malicious executable example. Thus each malicious executable signature contained only byte-sequences found in the malicious executable class. To make the signature unique, the byte-sequences found in each example were concatenated together to form one signature. This was done because a byte-sequence that was only found in one class during training could possibly be found in the other class during testing, and lead to false positives when deployed.

The virus scanner that was used to label the data set (step 16, above) contained signatures for every malicious example in the data set, so it was necessary to implement a similar signature-based method. This was done to compare the two algorithms' accuracy in detecting new malicious executables. In the tests, the signature-based algorithm was only allowed to generate signatures for the same set of training data that the data mining method used. This allowed the two methods to be fairly compared. The comparison was made by testing the two methods on a set of binaries not contained in the training set.

To quantify the performance of the method described herein, statistics were computed on the performance of the data mining-based method, tables 4 and 5 are included herein which include counts for true positives, true negatives, false positives and false negatives. A true positive, TP, is a malicious example that is correctly classified as malicious, and a true negative, TN, is a benign example that is correctly classified as benign. A false positive, FP, is a benign program that has been mislabeled by an algorithm as malicious, while a false negative, FN, is a malicious executable that has been mis-classified as a benign program.

The overall accuracy of the algorithm is calculated as the number of programs the system classified correctly divided by the total number of binaries tested. The detection rate is the number of malicious binaries correctly classified divided by the total number of malicious programs tested.

The results were estimated over new executables by using 5-fold cross validation technique, as described in R. Kohavi, "A Study of Cross-Validation and Bootstrap for Accuracy Estimation and Model Selection," *IJCAI*, 1995. Cross-validation, as is known in the art, is the standard method to estimate the performance of predictions over unseen data in Data Mining. For each set of binary profiles the data was partitioned into five equal size partitions. Four of the partitions were used for training a model and then evaluating that model on the remaining partition. Then the process was repeated five times leaving out a different partition for testing each time. This provided a measure of the method's accuracy on unseen data. The results of these five tests were averaged to obtain a measure of how the algorithm performs over the entire set.

To evaluate the algorithms over new executables, the algorithms generated their detection models over the set of training data and then tested their models over the set of test data. This was done five times in accordance with cross fold validation.

Tables 4 displays the results. The data mining algorithm had the highest detection rate, 97.76%, compared with the signature-based method's detection rate of 33.96%. Along with the higher detection rate the data mining method had a higher overall accuracy, 96.88% vs. 49.31%. The false positive rate of 6.01% though was higher than the signature-based method, 0%.

TABLE 4

| Profile Type | Detection Rate | False Positive Rate | Overall Accuracy |
| --- | --- | --- | --- |
| Signature Method | 33.96% | 0% | 49.31% |
| Data Mining Method | 97.76% | 6.01% | 96.88% |

Figure 11:
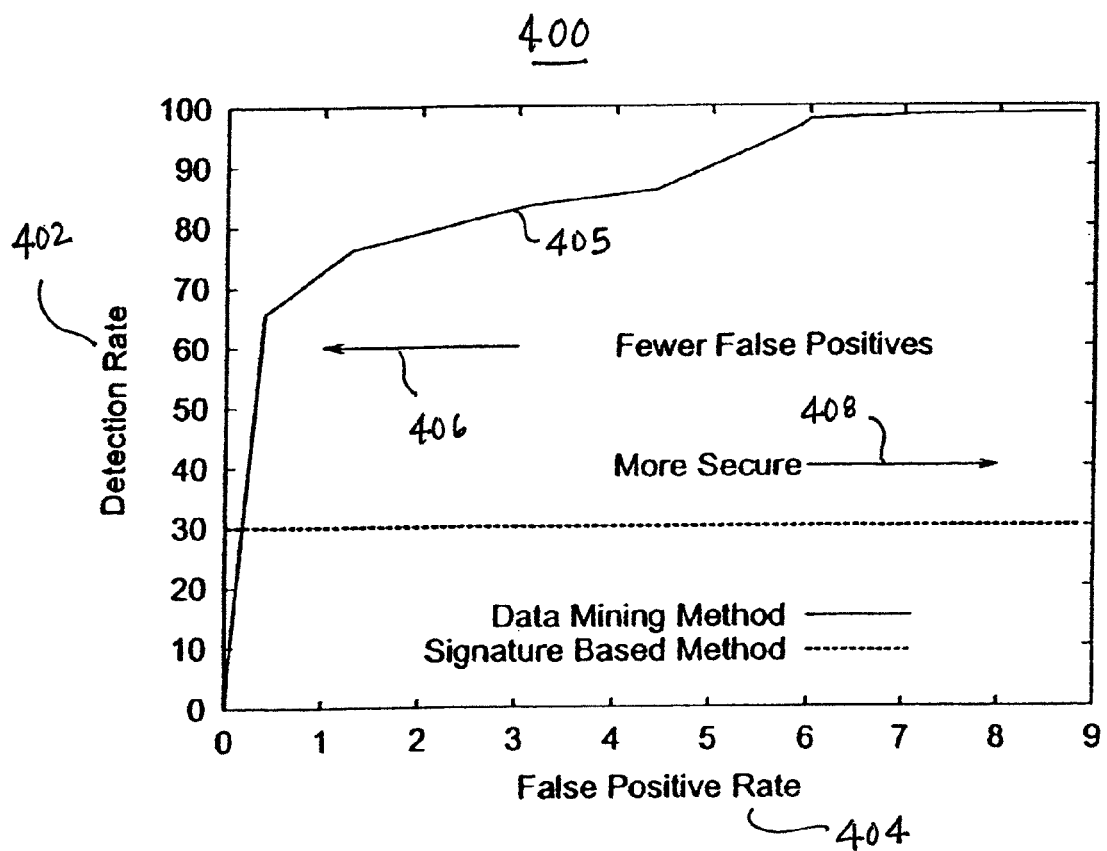
FIG. 11 is a plot illustrating the interactive effect of false positive rate and detection rate on the performance of the detection model or classifier in accordance with the present invention.

FIG. 11 displays the plot 400 of the detection rate 402 vs. false positive rate 404 using Receiver Operation Characteristic curves, as described in K. H. Zou et al., "Smooth Non-Parametric ROC Curves for Continuous Diagnostic Tests," *Statistics in Medicine,* 1997. Receiver Operating Characteristic (ROC) curves are a way of visualizing the trade-offs between detection and false positive rates. In this instance, the ROC curve shows how the data mining method (illustrated in dashed line 405) can be configured for different environments. For a false positive rate less than or equal to 1% the detection rate would be greater than 70%, and for a false positive rate greater than 8% the detection rate would be greater than 99%. Thus, more secure settings would select a threshold setting associated with a point on the data mining line towards the right (indicated by arrow 408), and applications needing fewer false alarms should choose a point towards the left (indicated by arrow 406).

The performance of the models in detecting known executables was also evaluated. For this task, the algorithms generated detection models for the entire set of data. Their performance was then evaluated by testing the models on the same training set.

As shown in Table 5, both methods detected over 99% of known executables. The data mining algorithm detected 99.87% of the malicious examples and misclassified 2% of the benign binaries as malicious. However, the signatures for the binaries that the data mining algorithm misclassified were identified, and the algorithm can include those signatures in the detection model without lowering accuracy of the algorithm in detecting unknown binaries. After the signatures for the executables that were misclassified during training had been generated and included in the detection model, the data mining model had a 100% accuracy rate when tested on known executables.

TABLE 5

| Profile Type | Detection Rate | False Positive Rate | Overall Accuracy |
| --- | --- | --- | --- |
| Signature Method | 100% | 0% | 100% |
| Data Mining Method. | 99.87% | 2% | 99.44% |

In order for the data mining algorithm to quickly generate the models, it is advantageous for all calculations to be done in memory. The algorithm consumed space in excess of a gigabyte of RAM. By splitting the data into smaller pieces, the algorithm was done in memory with no loss in accuracy. In addition, the calculations may be performed in parallel.

The training of a classifier took 2 hours 59 minutes and 49 seconds running on Pentium III 600 Linux machine with 1 GB of RAM. The classifier took on average 2 minutes and 28 seconds for each of the 4,301 binaries in the data set. The amount of system resources taken for using a model are equivalent to the requirements for training a model. So on a Pentium III 600 Linux box with 1 GB of RAM it would take on average 2 minutes 28 seconds per attachment. Another advantageous of splitting the data into smaller partitions (in connection with the Multi-Naive Bayes analysis) is that the Naive Bayes algorithm is executed on each partition on parallel hardware, which reduces the total training time from 2 hours and 59 minutes, to 2 minutes and 28 seconds if each piece is concurrently executed.

It will be understood that the foregoing is only illustrative of the principles of the invention, and that various modifications can be made by those skilled in the art without departing from the scope and spirit of the invention.

What is claimed is

1. A method for classifying an executable attachment in an email received at a computer system comprising:
   a) filtering said executable attachment from said email;
   b) extracting a byte sequence feature from said executable attachment; and
   c) classifying said executable attachment by comparing said byte sequence feature of said executable attachment with a classification rule set derived from byte sequence features of a set of executables having a predetermined class in a set of classes,
   wherein said classifying comprises determining using a computer processor, with a Multi-Naive Bayes algorithm, a probability that said executable attachment is a member of each class in said set of classes based on said byte sequence feature and dividing said step of determining said probability into a plurality of processing steps and executing said processing steps in parallel.

2. The method as defined in claim 1, wherein the step of extracting said byte sequence feature from said executable attachment comprises extracting static properties of said executable attachment.

3. The method as defined in claim 1, wherein the step of extracting said byte sequence feature from said executable attachment comprises converting said executable attachment from binary format to hexadecimal format.

4. The method as defined in claim 1, wherein the step of extracting said byte sequence features from said executable attachment comprises creating a byte string representative of resources referenced by said executable attachment.

5. The method as defined in claim 1, wherein the step of classifying said executable attachment comprises determining a probability that said executable attachment is a member of each class in a set of classes consisting of malicious and benign.

6. The method as defined in claim 1, wherein the step of classifying said executable attachment comprises determining a probability that said executable attachment is a member of each class in a set of classes consisting of malicious, benign, and borderline.

7. The method as defined in claim 1, wherein the step of classifying the executable attachment comprises classifying said executable attachment as malicious if said probability that said executable attachment is malicious is greater than said probability that said executable attachment is benign.

8. The method as defined in claim 1, wherein the step of classifying the executable attachment comprises classifying said executable attachment as benign if said probability that said executable attachment is benign is greater than said probability that said executable attachment is malicious.

9. The method as defined in claim 1, wherein the step of classifying the executable attachment comprises classifying said executable attachment as borderline if a difference between said probability that said executable attachment is benign and said probability that said executable attachment is malicious is within a predetermined threshold.

10. A system for classifying an executable attachment in an email received at a computer system comprising:
    one or more computer processors executing instructions which implement:
    a) an email filter configured to filter said executable attachment from said email;
    b) a feature extractor configured to extract a byte sequence feature from said executable attachment; and
    c) a rule evaluator configured to: classify said executable attachment by comparing said byte sequence feature of said executable attachment to a classification rule set derived from byte sequence features of a set of executables having a predetermined class in a set of classes,
    determine a probability that said executable attachment is a member of a class of said set of classes based on said byte sequence feature, and
    divide the determination of said probability into a plurality of processing steps and to execute said processing steps in parallel.

11. The system as defined in claim 10, wherein the feature extractor is configured to extract static properties of said executable attachment.

12. The system as defined in claim 10, wherein the feature extractor is configured to convert said executable attachment from binary format to hexadecimal format.

13. The system as defined in claim 10, wherein the feature extractor is configured to create a byte string representative of resources referenced by said executable attachment.

14. The system as defined in claim 10, wherein the rule evaluator is configured to predict the classification of said executable attachment as one class of a set of classes consisting of malicious and benign.

15. The system as defined in claim 10, wherein the rule evaluator is configured to predict the classification of said executable attachment as one class of a set of classes consisting of malicious, benign, and borderline.

16. The system as defined in claim 10, wherein the rule evaluator is configured to determine said probability that said executable attachment is a member of one class of said set of classes with a Naive Bayes algorithm.

17. The system as defined in claim 10, wherein the rule evaluator is configured to determine said probability that said executable attachment is a member of a class of said set of classes with a multi-Naive Bayes algorithm.

18. The system as defined in claim 10, wherein the rule evaluator is configured to classify said executable attachment as malicious if said probability that said executable attachment is malicious is greater than said probability that said executable attachment is benign.

19. The system as defined in claim 10, wherein the rule evaluator is configured to classify said executable attachment as benign if said probability that said executable attachment is benign is greater than said probability that said executable attachment is malicious.

20. The system as defined in claim 10, wherein the rule evaluator is configured to classify said executable attachment as borderline if a difference between said probability that said executable attachment is benign and said probability that said executable attachment is malicious is within a predetermined threshold.

* * * * *

UNITED STATES PATENT AND TRADEMARK OFFICE
CERTIFICATE OF CORRECTION

PATENT NO. : 7,979,907 B2
APPLICATION NO. : 12/338479
DATED : July 12, 2011
INVENTOR(S) : Matthew G. Schultz et al.

Page 1 of 1

It is certified that error appears in the above-identified patent and that said Letters Patent is hereby corrected as shown below:

ON THE TITLE PAGE:

--Item (75) Inventors:   Matthew G. Schultz, Ithaca, NY (US); Eleazar Eskin, Santa Monica, CA (US); Erez Zadok, Middle Island, NY (US); Manasi Bhattacharyya, Flushing, NY (US); Stolfo Salvatore, Ridgewood, NJ (US)

should read

--Item (75) Inventors:   Matthew G. Schultz, Ithaca, NY (US); Eleazar Eskin, Santa Monica, CA (US); Erez Zadok, Middle Island, NY (US); Manasi Bhattacharyya, Flushing, NY (US); Salvatore J. Stolfo, Ridgewood, NJ (US)

Signed and Sealed this
Sixteenth Day of August, 2011

David J. Kappos
*Director of the United States Patent and Trademark Office*